Figure 1:
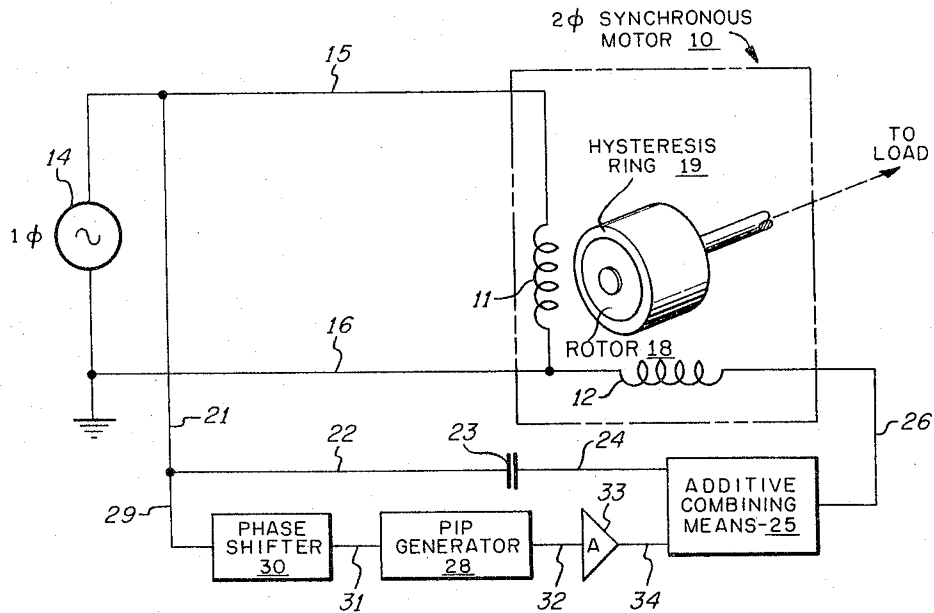

Jan. 31, 1967 R. H. BOLTON 3,302,084

CONTROL CIRCUITS FOR HYSTERESIS MOTORS

Filed Jan. 31, 1964

INVENTOR.
ROBERT H. BOLTON
BY Arthur H. Serrell
ATTORNEY

United States Patent Office 3,302,084

Patented Jan. 31, 1967

3,302,084

CONTROL CIRCUITS FOR HYSTERESIS MOTORS

Robert H. Bolton, Huntington, N.Y., assignor to Sperry Rand Corporation, Great Neck, N.Y., a corporation of Delaware Filed Jan. 31, 1964, Ser. No. 341,724
2 Claims. (Cl. 318—166)

This invention relates to a rotor magnetizing combination that includes an A.C. source of power and a synchronous motor of the hysteresis type.

The fixed component of the motor is provided by a conventional stator whose energized polyphase windings produce a flux field that moves about an axis at a speed related to the frequency of the source and the number of poles of the windings. The movable component of the motor is provided by a rotor with a ring or other surface element of a material that is magnetized by the currents induced therein by the moving stator field. The resulting magnetic field of the rotor reacts with the moving stator field to turn the rotor at the same speed. When the rotor comes up to synchronous speed, the poles induced in the hysteresis ring or element are opposite the moving poles of the rotating field of the stator and the rotor magnetically locks with the stator field. The induced magnetic field of the rotor is accordingly always in alignment with the rotating field of the stator at synchronous speed as long as the motor operation is not influenced by transient conditions or an interruption in the supply of power to the windings of the stator. In motors of this character, the hysteresis rotor is normally magnetized at a fixed power level at synchronous speed. Under starting conditions for known synchronous motors, the input power to the stator may be increased to further raise the magnetization level of the rotor temporarily. The same result has been obtained through additional controls that sense changes in the speed of the rotor or through motor control off-on timing device. In the improved combination, the motor operates without change in the polyphase input supplied to energize the stator windings from the source under both starting and operating conditions at a magnetization level of the hysteresis rotor considerably higher than the conventional fixed level at synchronous speed.

Relatively low torque conversion efficiency is one of the characteristics of the described type of electric motors where the efficiency is defined as the torque produced at the air gap times synchronous speed divided by total input power. With a gyroscopic load, for example, the only output torque required of the motor is that necessary to overcome frictional losses in the bearings and the windage of the load. Typical efficiencies for such motors run about 30 percent at best where with a motor having ten watts in input power, two watts are utilized to account for bearing friction, one watt is utilized to take care of windage effects, six and a half watts is stator $I^2R$ loss and one half watt is stator iron loss. The reason for the rather high internal motor losses in the stator is the fact that the component of primary current required at the windings of the stator to magnetize the hysteresis rotor often exceeds the component of primary current necessary to produce torque. Since this current flows through the winding resistance, the resultant $I^2R$ loss becomes disproportionally high even when the motor is started at a voltage level above running voltage and the stator is energized at a lower voltage level under synchronous operating conditions.

The primary object of the invention is to magnetize the rotor of a synchronous motor of the character described so that the torque conversion efficiency of the motor is increased without overenergizing the windings of the stator, sensing changes in the speed of the rotor to control the degree of energization, or changing from one energy level to another at a fixed time interval as at starting.

In accordance with the invention, the improved combination includes a phase shifter and pip generator that provide voltage pulses for the energization of the stator in phase with the voltage output in one of the power lines to the motor. The supplemental stator energization provided by the pulses causes magnetization of the rotor that minimizes the $I^2R$ loss with the motor operating under starting as well as synchronous speed conditions. The efficiency of the motor is accordingly more than doubled.

Figure 2:
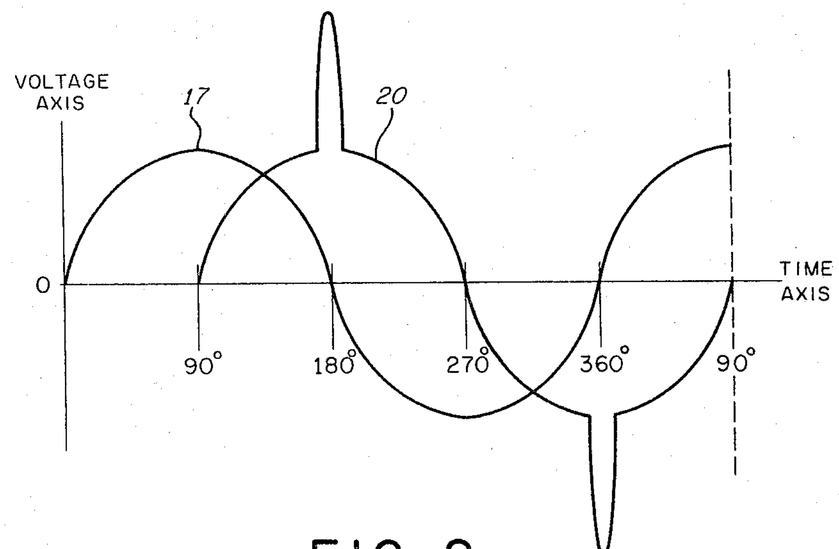

Other objects, features and structural details of the invention will be apparent from the following description when read in conjunction with the accompanying drawings in which:

FIG. 1 is a schematic view and circuit diagram of the improved synchronous motor combination, and FIG. 2 is a graph showing the voltage inputs continuously fed to the windings of the motor to magnetize the rotor.

As shown in FIG. 1, the motor component of the invention is represented as a 2$\phi$ synchronous motor 10 whose stator includes windings 11 and 12. The stator winding 11 is energized from a single phase source of alternating current 14 by way of power line 15 and the ground line 16. The source 14 produces a sinusoidal voltage output as indicated on the graph in FIG. 2 at 17, that is directly fed to the winding 11 through the input line 15 to energize the stator in the conventional manner. In FIG. 1, the moving element of the motor 10 is indicated as a rotor 18 carrying a hysteresis ring 19 that is magnetized by the travelling flux field produced when the windings of the stator are energized. In the rotor structure shown, a hysteresis ring 19 provides the magnetizable portion of the rotor.

In accordance with the present invention, one of the windings of the motor such as winding 12 is cyclically energized at a higher voltage than the source to raise the magnetization level of the rotor over that provided from the source alone by supplementing the source voltage with in phase voltage pulses as indicated by the voltage curve 20 in FIG. 2. The source input circuit provided for winding 12 in FIG. 1 includes a lead 21 connected to lead 15, connecting lead 22, a capacitor 23, lead 24 and a suitable means for additively combining voltages indicated at 25. Means 25 is further connected to winding 12 by way of lead 26. A pip generator indicated at 28 provides a means energized in accordance with the frequency of the source 14 for producing a relatively narrow voltage pulse input to the winding 12. In the illustrated circuitry, the generator 28 is connected to the source 14 by way of lead 15, lead 21 connecting lead 29, a phase shifter 30 and lead 31. The output of the generator 28 provides the pulse input to the combining means 25 by way of lead 32, a variable gain amplifier 33 and lead 34. The shifter 30, generator 28 and amplifier 33 are in a circuit parallel to the voltage line between the source and means 25 that includes capacitor 23. The shifter 30 ahead of the generator 28 changes the phase of the source voltage to the generator 28 by approximately ninety degrees or to the degrees necessary for pulses to occur in timed relation to the peaks of the sinusoidal voltage output of the source to the voltage power line 26 as shown in curve 20 in FIG. 2. The amplifier 33 in the circuit between the generator 28 and means 25 provides adjustment for the tops of the pulse voltages in the curve 20. Thus, the combining means included adds the pulses to the quadrature voltage line to provide the wave shape indicated by the curve 20 as an input to the winding 12 of the motor.

The pulses supplementing the source output to winding 12 supply magnetizing current to the hysteresis ring cyclically above that provided from the source alone. The hysteresis ring retains the increased magnetism and the motor operates at a higher efficiency due to the reduction of the heretofore noted $I^2R$ loss.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In combination, a synchronous motor having a stator with polyphase windings and a rotor of the hysteresis type, means for magnetizing the rotor including an A.C. source having a sinusoidal voltage output, power lines connecting the source to the stator windings, means including a pip generator energized in accordance with the frequency of the source for producing relatively narrow voltage pulses in phase with the voltage output of the source supplied to one of the windings, and combining means for adding the pulses to the voltage power line connecting said one winding, said pip generator being connected in a circuit parallel with the power line connecting said one winding, a phase shifter connected in series with said pip generator, and a variable gain amplifier connected in series with said pip generator and phase shifter.

2. A combination for magnetizing the rotor of a synchronous motor having a polyphase wound stator and including an A.C. source having a sinusoidal voltage output, a voltage adding means, a first input line connecting the source to the voltage adding means, an output line connecting the voltage adding means to one of the windings of the stator, a second input line to the voltage adding means in parallel with said first input line having a pip generator therein providing a narrow voltage pulse output in phase with the voltage output of the source, a phase shifter in said second input line for controlling the timing of the voltage pulse relative to voltage on said first input line, and a variable gain amplifier between said pip generator and said adding means for controlling the amplitude of said voltage pulse.

References Cited by the Examiner

UNITED STATES PATENTS 2,429,807 10/1947 Dewan ------------ 318—166

ORIS L. RADER, *Primary Examiner.*

G. Z. RUBINSON, *Assistant Examiner.*